US011314676B2

(12) United States Patent
Tune et al.

(10) Patent No.: US 11,314,676 B2
(45) Date of Patent: Apr. 26, 2022

(54) APPARATUS AND METHOD FOR BUFFERED INTERCONNECT

(71) Applicant: ARM LIMITED, Cambridge (GB)

(72) Inventors: Andrew David Tune, Sheffield (GB); Sean James Salisbury, Sheffield (GB)

(73) Assignee: Arm Limited, Cambridge (GB)

( * ) Notice: Subject to any disclaimer, the term of this patent is extended or adjusted under 35 U.S.C. 154(b) by 1540 days.

(21) Appl. No.: 14/944,340

(22) Filed: Nov. 18, 2015

(65) Prior Publication Data

US 2016/0203094 A1    Jul. 14, 2016

(30) Foreign Application Priority Data

Jan. 12, 2015   (GB) ...................................... 1500428

(51) Int. Cl.
| | |
|---|---|
| *G06F 13/40* | (2006.01) |
| *G06F 12/0815* | (2016.01) |
| *G06F 13/16* | (2006.01) |
| *G06F 13/42* | (2006.01) |

(52) U.S. Cl.
CPC ...... *G06F 13/4022* (2013.01); *G06F 12/0815* (2013.01); *G06F 13/1673* (2013.01); *G06F 13/4282* (2013.01); *G06F 2212/622* (2013.01)

(58) Field of Classification Search
CPC ............. G06F 12/0815; G06F 13/4022; G06F 13/1673; G06F 13/4282; G06F 2212/622
See application file for complete search history.

(56) References Cited

U.S. PATENT DOCUMENTS

| | | | | |
|---|---|---|---|---|
| 7,065,050 B1* | 6/2006 | Herbst | .................... | H04L 12/46 370/235 |
| 7,068,672 B1* | 6/2006 | Jones | .................... | H04L 47/263 370/412 |
| 7,209,440 B1* | 4/2007 | Walsh | .................... | H04L 47/11 370/230 |
| 2002/0146002 A1* | 10/2002 | Sato | .................... | H04L 12/4679 370/386 |
| 2002/0146022 A1* | 10/2002 | Van Doren | ........... | H04L 49/108 370/412 |

(Continued)

OTHER PUBLICATIONS

Search Report for GB 1500428.6 dated Jul. 7, 2015, three pages.

*Primary Examiner* — Zachary K Huson
(74) *Attorney, Agent, or Firm* — Nixon & Vanderhye P.C.

(57) ABSTRACT

There is provided an interconnect for transferring requests between ports in which the ports include both source ports destination ports. The interconnect includes storage circuitry for storing the requests. Input circuitry receives the requests from the plurality of source ports, selects at least one selected source port from an allowed set of said plurality of source ports, and transfers a presented request from the at least one selected source port to the storage circuitry. Output circuitry causes a request in said storage circuitry to be output at one of said plurality of destination ports. Counter circuitry maintains counter values for a plurality of tracked ports from amongst said ports, each counter value indicating the number of requests in said storage circuitry associated with a corresponding tracked port that are waiting to be output by said output circuitry and filter circuitry determines whether or not a given source port is in said allowed set in dependence on said counter circuitry.

14 Claims, 6 Drawing Sheets

(56) References Cited

U.S. PATENT DOCUMENTS

2013/0031314 A1* 1/2013 Kinter ................. G06F 12/0811
  711/141
2014/0173163 A1* 6/2014 Kitahara ............... G06F 15/173
  710/310

* cited by examiner

APPARATUS AND METHOD FOR BUFFERED INTERCONNECT

This application claims priority to GB Patent Application No. 1500428.6 filed 12 Jan. 2015, the entire content of which is incorporated by reference.

TECHNICAL FIELD

The present technique relates to interconnect circuitry. In particular, the present technique relates to interconnect circuitry having a buffer.

BACKGROUND

An interconnect circuitry is used in order to connect a number of devices together. The interconnect circuitry makes it possible to transmit a request from a source device to a destination device. Typically when using such an interconnect, it is only possible for a destination device to receive from a single source device at a time. Consequently, if multiple source devices wish to transmit to the same destination device, it may be necessary for some of those source devices to wait. The waiting source devices may have a queue of requests that are to be transmitted to other destination devices. When this happens, a phenomenon known as head-of-line blocking may occur. This represents the situation in which requests at the back of such a queue are directed towards destination devices that are otherwise unengaged. However, due to the source device having to wait for other source devices to transmit their requests before it can transmit the request at the front of its queue, the requests at the back of the queue cannot be transmitted. Head-of-line blocking can lead to an inefficient use of the bandwidth of the interconnect. Whilst head-of-line blocking could be alleviated by providing a mechanism to cancel some requests, rather than leaving them to wait, and employing a higher-level protocol to take necessary actions to re-transmit them if required, this would significantly increase complexity.

One other way to alleviate head-of-line blocking may be to provide a shared buffer into which requests from the source devices may be input. This may essentially enable a re-ordering of requests provided by each of the source devices and thereby allow a more efficient use of bandwidth to take place. However, if such a buffer were to be provided, it may be possible for one or more source devices to completely fill the buffer with requests. If these requests are unable to make progress (for example if the destination device or devices targeted by the requests are particularly slow) then head-of-line blocking will still occur as a consequence of source devices being unable to insert requests into the buffer.

Accordingly, it would be desirable to provide a technique that enables head-of-line blocking to be alleviated whilst reducing the possibility of a subset of source devices filling the buffer and thereby causing head-of-line blocking to occur on other source devices.

SUMMARY

Viewed from a first aspect, there is provided an interconnect to transfer requests between ports, the ports comprising a plurality of source ports and a plurality of destination ports, the interconnect comprising: storage circuitry to store said requests; input circuitry to receive said requests from said plurality of source ports, to select at least one selected source port from an allowed set of said plurality of source ports, and to transfer a presented request from said at least one selected source port to said storage circuitry; output circuitry to cause a request in said storage circuitry to be output at one of said plurality of destination ports; counter circuitry to maintain counter values for a plurality of tracked ports from amongst said ports, each counter value indicating the number of requests in said storage circuitry associated with a corresponding tracked port that are waiting to be output by said output circuitry; and filter circuitry to determine whether or not a given source port is in said allowed set in dependence on said counter circuitry.

According to a second aspect there is provided an interconnect to transfer requests between ports, the ports comprising a plurality of source ports and a plurality of destination ports, the interconnect comprising: storage means for storing said requests; input means for receiving said requests from said plurality of source ports, for selecting at least one selected source port from an allowed set of said plurality of source ports, and for transferring a presented request from said at least one selected source port to said storage means; output means for causing a request in said storage means to be output at one of said plurality of destination ports; counter means for maintaining counter values for a plurality of tracked ports from amongst said ports, each counter value indicating the number of requests in said storage means associated with a corresponding tracked port that are waiting to be output by said output means; and filter means for determining whether or not a given source port is in said allowed set in dependence on said counter circuitry.

According to a third aspect there is provided a method of transferring requests between ports, the ports comprising a plurality of source ports and a plurality of destination ports, the method comprising the steps: receiving said requests from said plurality of source ports; selecting at least one selected source port from an allowed set of said plurality of source ports; transferring a presented request from said at least one selected source port to storage circuitry; outputting, at one of said plurality of destination ports, a request in said storage circuitry; maintaining counter values for a plurality of tracked ports from amongst said ports, each counter value indicating the number of requests in said storage circuitry associated with a corresponding tracked port that are waiting to be output, wherein it is determined whether or not a given source port is in said allowed set in dependence on said counter values.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments and associated advantages is provided.

In accordance with one aspect there is provided an interconnect to transfer requests between ports, the ports comprising a plurality of source ports and a plurality of destination ports, the interconnect comprising: storage circuitry to store said requests; input circuitry to receive said requests from said plurality of source ports, to select at least one selected source port from an allowed set of said plurality of source ports, and to transfer a presented request from said at least one selected source port to said storage circuitry; output circuitry to cause a request in said storage circuitry to be output at one of said plurality of destination ports; counter circuitry to maintain counter values for a plurality of tracked ports from amongst said ports, each counter value indicating the number of requests in said storage circuitry associated with a corresponding tracked port that are waiting to be output by said output circuitry; and filter circuitry to determine whether or not a given source port is in said allowed set in dependence on said counter circuitry.

In accordance with the above, the input circuitry receives requests from the plurality of source ports and inserts a request presented by a selected source port into storage circuitry (e.g. a buffer). Filter circuitry is used in order to determine whether or not a particular source port is allowed to be selected. In particular, a number of counter values are maintained by counter circuitry, which counts, for each tracked port, the number of requests currently stored in the storage circuitry that are still waiting to be output by output circuitry and that are associated with that tracked port. Based on these counter values, the input circuitry's selection is restricted. When a request presented by a source port is input into the storage circuitry, the value maintained by the counter circuitry is updated. The output circuitry causes requests stored in the storage circuitry to be output at one of the destination ports. When a request is output by the output circuitry, the counter value for the associated tracked port will also be updated.

Accordingly, only a limited number of requests associated with each tracked port may be stored in the storage circuitry and awaiting output. Consequently, this mechanism can be used to prevent the storage circuitry being filled with requests associated with a small number of the ports. If, for example, a single source port transmits a large number of requests in a short space of time then it will rapidly reach a point at which the filter circuitry blocks more requests being accepted from that particular source port. Other source ports may continue to insert requests into the storage circuitry and when requests associated with that blocked source port are output by the output circuitry from the storage circuitry that source port will be permitted to add more entries to the storage circuitry. Consequently, it is possible to reduce head-of-line blocking overall whilst reducing the chance of head-of-line blocking occurring at any port as a consequence of the storage circuitry being filed.

The plurality of tracked ports may comprise the plurality of source ports and the counter value may correspond to the number of requests stored in the storage circuitry that have been sent by that source port that have not yet been output by said output circuitry. Accordingly, control can be kept over the addition of entries by source ports into the storage circuitry. The plurality of tracked ports can (alternatively or additionally) comprise the plurality of destination ports and the counter value may therefore correspond to the number of requests stored in the storage circuitry that are directed to a particular destination port that have not yet been output by said output circuitry. By tracking the number of requests that are queuing for a particular destination, it may be possible to determine whether or not (and to what extent) a destination is over-subscribed. This may be used to inhibit the situation in which further requests targeting that destination are added to the buffer, which could cause the buffer to fill up, inhibiting the ability of sources to insert requests to other destinations.

The counter circuitry may comprise first adjustment circuitry to adjust the counter value associated with a port in a first direction in response to said presented request being associated with said port. Consequently, it may be possible to express a specific number of requests associated with a particular port that are permitted to be in the storage circuitry and are waiting to be output at a particular moment. Hence, may be possible to precisely control the number of requests that may be inserted into the storage circuitry for a particular tracked port. For example, the first direction may be towards zero. For example, the counter value may be decremented as the buffer is filled with requests associated with a particular port. This may be advantageous, since it may be more spatially efficient to provide circuitry that decrements a counter value rather than incrementing the counter value.

The counter value may comprise second adjustment circuitry to adjust the counter value associated with a port in a second direction opposite to said first direction in response to a request associated with said port being output by said output circuitry.

The output circuitry may comprise further output circuitry to cause a request in said storage circuitry to be output at one of said plurality of source ports. For example, this may occur as a result of a cache coherence protocol. For example, the further output circuitry may output said request at said one of said plurality of source ports, in response to a master device, connected to one of said plurality of source ports comprising a cache that comprises a data value that is related to said request. In particular, snooping occurs when a master device requests data where the latest version of that data may be stored in the cache of another master. In these cases, it is inappropriate for the value to be obtained from memory since this value may be out-of-date. Snooping circuitry is provided in order to detect such requests, to query some or all of the other master devices in order to determine whether or nit they have the latest version of the data, to receive snoop responses from those master devices that provide answers to the snoop requests, and if necessary returning data that is sent in one of those snoop responses to the requesting master device rather than forwarding the request to memory. Where such requests are issued, the further output circuitry will select a request from the storage circuitry and will output the request in the form of a snoop request) at one of the source ports rather than at one of the destination ports. In these cases, since the request has been output, even though it has not been output at one of the destination ports, the counter circuitry will still adjust the associated counter value.

The filter circuitry may determine that a tracked port is in said allowed set in dependence on said counter value for said tracked port reaching a threshold value associated with that source port. For example, when a tracked port reaches a threshold value, the filter circuitry may determine that the tracked port is not in the allowed set. As another example, when the counter value associated with a tracked port reaches the threshold value, the filter circuitry may determine that the tracked port is in the allowed set.

In some embodiments, the threshold value is different for least some of the plurality of tracked ports. Consequently, it is possible to provide some of the tracked ports with a lesser or greater share of the storage circuitry. For example, if a source port is known to provide a large number of requests in a short period of time, then that source port may be allocated a greater share of the storage circuitry. Similarly, if a particular source port is unlikely to issue a large number of requests, then it may be given a smaller share of the storage circuitry. The distribution of the storage circuitry may be represented by giving the counter for the first source port a higher threshold value and the counter for the second source port a lower threshold value. The first source port will be required to issue a larger number of requests before being prevented from adding further requests to the buffer than for the second source port.

The counter circuitry may maintain a plurality of flags each associated with one of the ports, wherein a flag associated with a port is set in dependence on the counter value associated with that port and the filter circuitry may determine that a particular port is in said allowed set in dependence on whether or not said flag associated with said particular port is set. Such an approach is particularly efficient, since it may be possible to determine the allowed set based on a set of flags rather than comparing counter values. In particular, the circuitry may operate more quickly if a flag or set of flags is compared rather than comparing a set of counter values against a set of limits for those counter values.

The threshold value may be chosen having regards to balancing the inhibition of head-of-line blocking amongst said plurality of source ports. For example, the threshold value may be chosen such that it is large enough in order to reduce head-of-line blocking overall, but small enough that a subset of the source ports do not fill the buffer thereby causing the head-of-line blocking to occur for source ports outside that subset.

The threshold value may be chosen so as to allow at least one request from each port to be stored in said storage circuitry and waiting to be output by said output circuitry. In this way, regardless of the number of requests produced by any of the source ports, each source port will be able to transmit at least one message via the buffer at a time.

Particular embodiments will now e described with reference to the figures.

Figure 1:
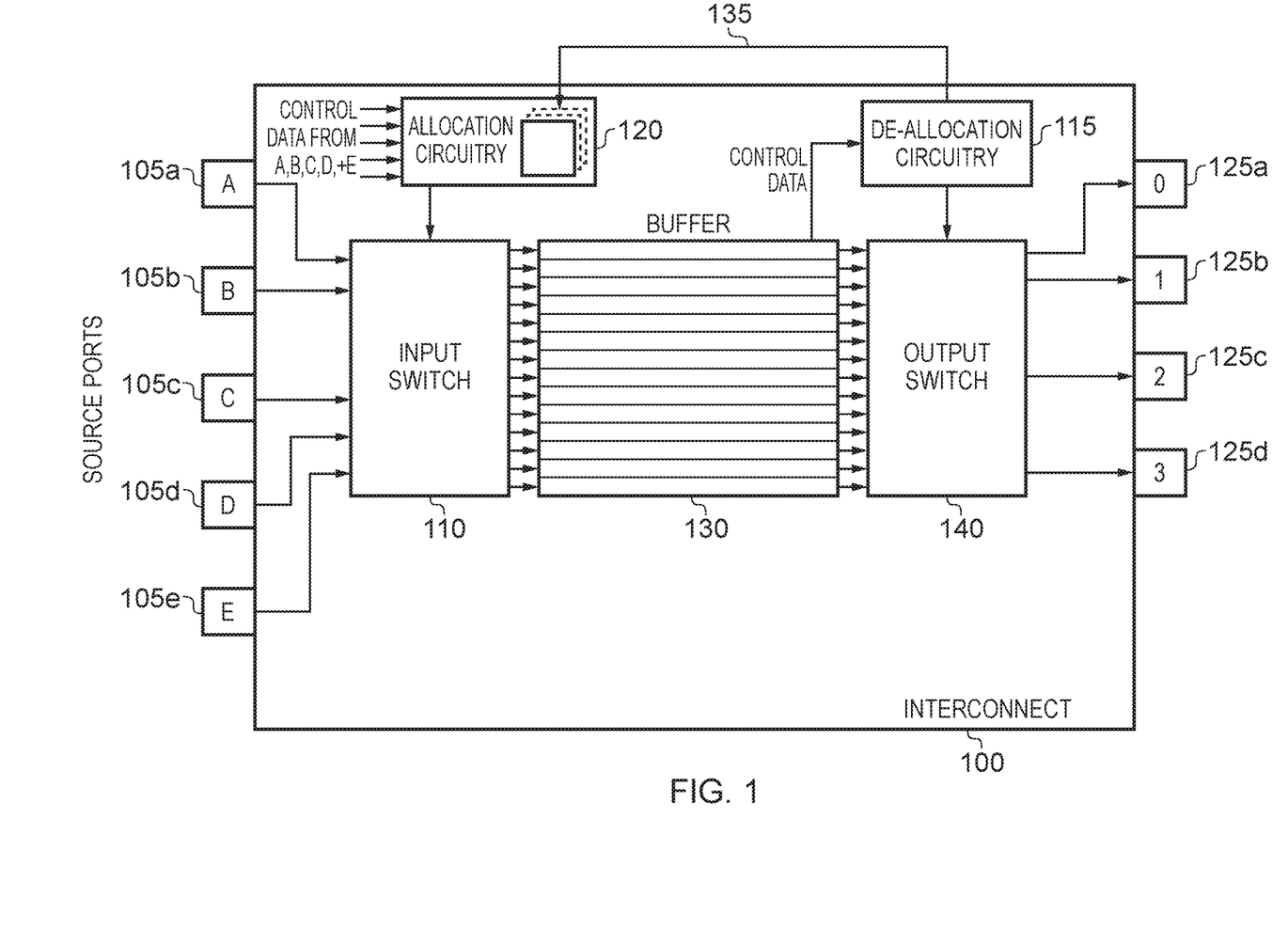
FIG. 1 is a diagram illustrating, schematically, an example of an interconnect in accordance with one embodiment.

FIG. 1 illustrates an interconnect 100 in accordance with one embodiment. The interconnect 100 receives requests from a plurality of source ports 105a, 105b, 105c, 105d and 105e. Each of these source ports may, for example, be connected to a master device. The interconnect 100 comprises input circuitry comprising an input switch 110 and allocation circuitry 120. The interconnect 100 also comprises output circuitry comprising an output switch 140 and de-allocation circuitry 115. Each of the source ports 105a-105e provides requests to the input switch 110. Additionally, each of the source ports 105a-105e provides control data (control information) to the allocation circuitry 120. The allocation circuitry 120 considers the currently allowed set of source ports and selects a source port from that set. The ID of the selected source port is forwarded to the input switch 110. The input switch 110 then receives a request from the selected source port and inserts it into the buffer 130. The output switch 140 receives each request from the buffer 130 and delivers it to the associated destination port from the set of destination ports 125a, 125b, 125c, and 125d. The selection of which entry in the buffer is to be delivered to the associated destination port is made by the de-allocation circuitry 115, which controls the output switch 140 to remove an entry from the buffer 130 and deliver it to the relevant destination port. The de-allocation circuitry is able to make the selection by receiving control data (control information) from the buffer 130 regarding the requests in the buffer. Additionally, the de-allocation circuitry 115 sends a control signal 135 to the allocation circuitry 120 in respect of the source port associated with the entry removed from the buffer 130. Accordingly, at the time the output switch outputs a request from the buffer 130 to one of the destination ports 125a-125d, the control signal 135 transmitted by the de-allocation circuitry 115 to the allocation circuitry 120 may cause the allowed set to change. Subsequently, the input switch 110 may select a request from a source port to be entered into the buffer 130 when previously requests from that source port were not permitted to proceed.

Note that although, in this embodiment, a single shared buffer 130 is provided for the full set of source ports 105a-105e, it is not necessary that there is only one shared buffer. In other embodiments, a number of shared buffers may be provided. For example, a single shared buffer may be provided for a first subset of source ports 105a, 105b and a second shared buffer may be provided for a second subset of source ports 105c, 105d, and 105e. Each of the shared buffers may also have its own associated input switch and output switch. Similarly, a first shared buffer may be provided for a first subset of the destination ports 125a, 125b and a second shared buffer may be provided for a second subset of the destination ports 125c, 125d.

Additionally, in some embodiments, the output switch does not immediately remove an entry from the buffer 130. For example, for some transactions, it may be desirable to deliver a request while continuing to store that request in the buffer 130 (possibly for future reference in delivering a response back to the correct source port or to detect address and/or ordering hazards). In such instances, the output switch 140 will still deliver the request, and the de-allocation circuitry 115 will still transmit a control signal 135 to the allocation circuitry 120 in respect of the source port that transmitted the request that has been delivered. Hence, even though the request s not immediately removed from the buffer 130, the selection of the source port may proceed as if the entry had been removed.

Figure 2:
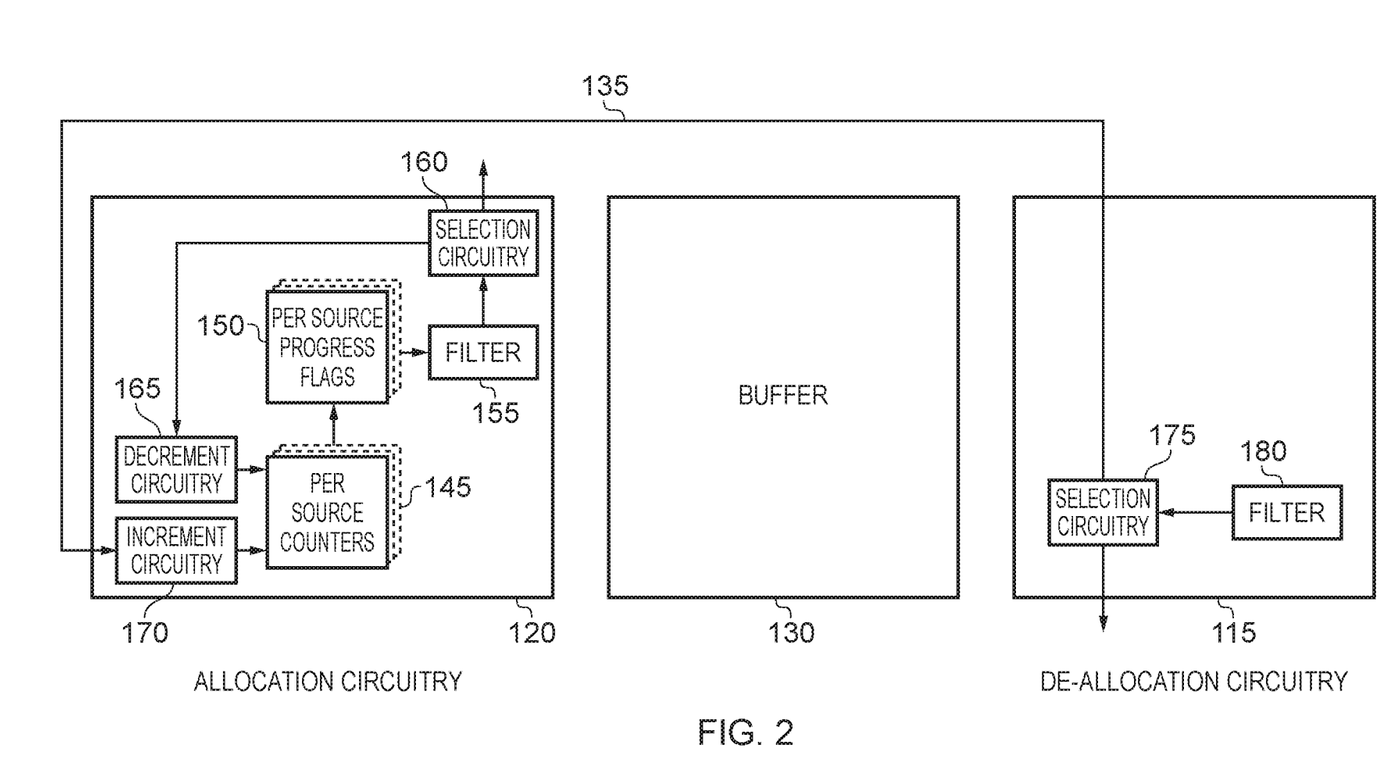
FIG. 2 illustrates, in accordance with one embodiment an example of allocation circuitry and de-allocation circuitry.

FIG. 2 illustrates an example of allocation circuitry 120 and de-allocation circuitry 115 in accordance with one embodiment.

The allocation circuitry 120 comprises a plurality of counters 145. Each of these counters may be associated with a different port such as a source port. A plurality of progress flags 150 is also provided. One progress flag is provided for each port such as each port. The progress flag for a particular port is set in dependence on the value of the source counter for that port. In particular, when the counter for a particular source port reaches a predefined threshold (such as 0) for that source port, then the progress flag associated with that particular source port will be set. A filter 155 is provided to filter the set of ports in dependence on the progress flags 150. In particular, the filter 155 provides selection circuitry 160 with the set of ports for which the progress flags are not set. Consequently, the selection circuitry 160 is provided with the set of source ports for which the counter value is above the predefined threshold. The selection circuitry 160 outputs a selected port such as a source port from the set of source ports that have not been filtered by the filter circuitry 155. The selected source port is then provided to the input switch 110 as shown with reference to FIG. 1. In addition, the selected port is provided to the decrement circuitry 165. The decrement circuitry 165 decrements the counter from the plurality of counters 145 which is associated with the port that has been selected by the selection circuitry 160. Accordingly, when a particular port is selected by the selection circuitry 160 the counter associated with that port will be decremented and if the new counter value reaches the predefined threshold value for that port, the progress flag associated with that port will be set thereby preventing the port from being selected in the future by virtue of the filter 155.

The allocation circuitry 120 also includes increment circuitry 170 that performs an opposite operation to the decrement circuitry 165.

The de-allocation circuitry 115 comprises a filter 150. The filter 180 determines the destination ports 125a-125d that are requested by entries in the buffer. This set of ports is passed to the selection circuitry 175, which selects a destination port and then selects between the entries in the buffer 130 that are directed towards that destination port. Once a particular port, has been selected, this information is passed to the output switch 140, which removes the entry from the buffer 130 and sends it to the relevant destination port. The information is also passed to the increment circuitry 170 of the allocation circuitry 120 via a control signal 135. This causes the counter in the plurality of counters 145 that is associated with the source port that transmitted the request in the selected buffer entry. Accordingly, the associated source port may then be permitted to insert additional entries into the buffer 130.

Figure 3:
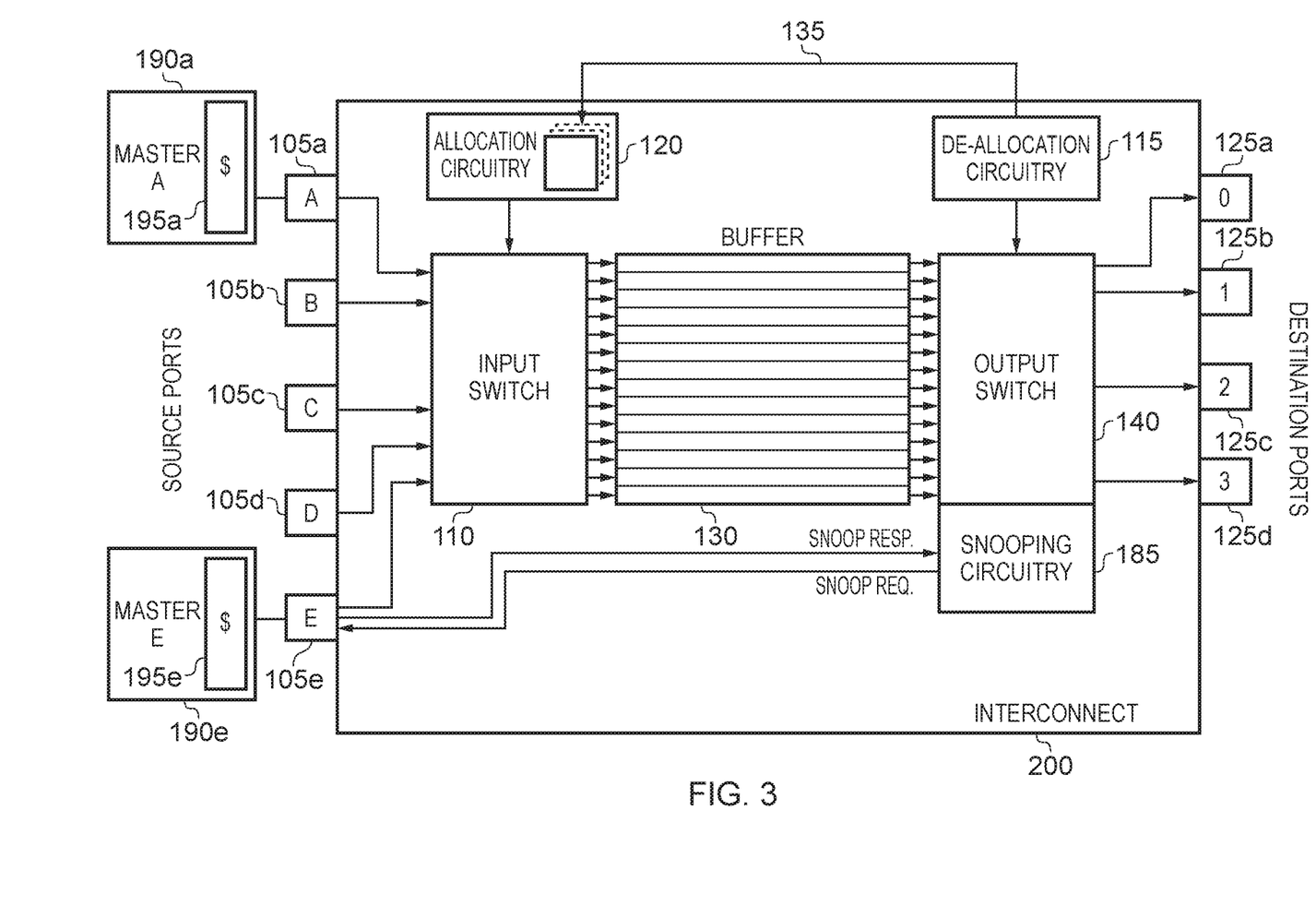
FIG. 3 is a diagram illustrating, schematically, an example of an interconnect comprising snooping circuitry for use with one or more master devices comprising caches in accordance with one embodiment.

FIG. 3 illustrates an interconnect 200 in accordance with one embodiment. Similar reference numerals have been used where an element is substantially unchanged from the description in respect of FIG. 1.

In the embodiment of FIG. 3, the output switch 140 additionally comprises snooping circuitry 185. Additionally, a master device A 190a having a cache 195a is connected to source port A 105a and a master device E 190e having a cache 195e is connected to source port E 105e. The snooping circuitry 185 is able to monitor the requests obtained by the output switch 140. If a request relates to data that might be stored in one of the caches 195a, 195e then, rather than outputting the request to one of the destination ports 125a to 125d, the snooping circuitry 185 will issue the request, in the form of a snoop request, to some or all of the master devices 190a, 195e via the source ports 105a, 105e. The snoop request causes the master devices 195a, 195e to query their caches 195a, 195e to determine if those caches contain a more up-to-date version of the data than is stored in memory. The queried master devices then respond with a snoop response that may be sent directly to the snooping circuitry 185, indicating whether or not such data is present and including the data itself if more up-to-date data was present in the cache. In such instances, the output switch 140 does not output the request that was stored in the buffer 130 at one of the destination ports 125a to 125d. However, since the request has still been served, the output switch 140 notifies the de-allocation circuitry 115 to send a control signal 135 to the increment circuitry 170 of the allocation circuitry 120 to increment the counter in the plurality of counters 145 associated with the source port that issued the request.

Figure 4:
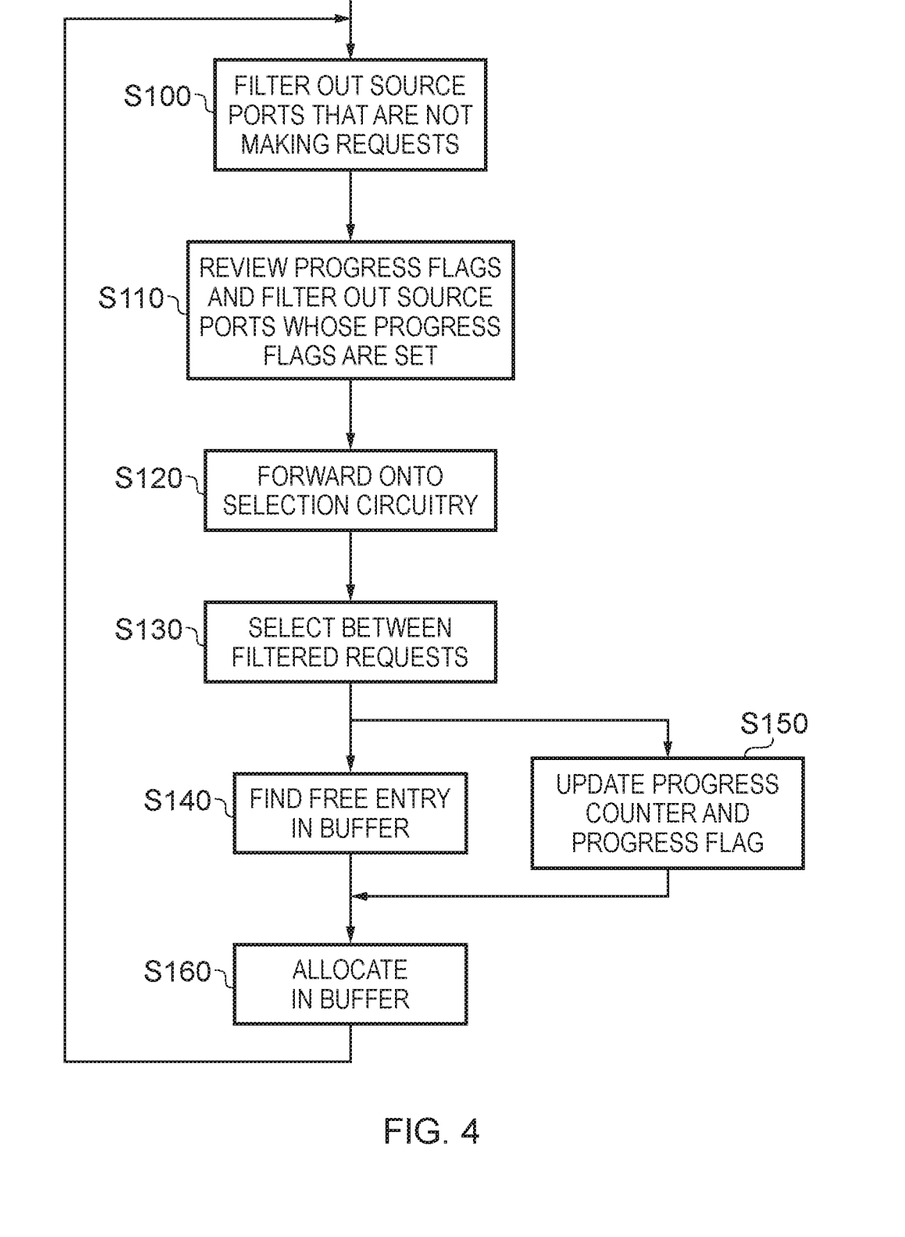
FIG. 4 illustrates, in flow chart form, a method of allocating entries to a buffer in accordance with one embodiment.

FIG. 4 illustrates, in flow chart form, a method of selecting a request to be inserted into the buffer 130. Such a method may be performed, for example, by the allocation circuitry 120 and input switch 110.

The method begins at step S100, where the source ports 105a to 105e that are not making requests are filtered out. Accordingly, no selection takes place in respect of a source port that has no request to be inserted into the buffer 130.

At step S110, the progress flags are reviewed and the source ports whose progress flags are set are filtered out. As previously explained, the progress flags 150 may be set in dependence on the values of the counters 145 that are associated with the source ports 105a-105e. Such a review may take place, for example, by filter circuitry 155. The filtered set of source ports is then provided, at step S120, to the selection circuitry 160. At step S130, the selection circuitry 160 selects one of the source ports from the filtered set of source ports provided by the filter 155. Then, at step S140 a free entry is found in the buffer 130 and at step S150, the progress counter in the plurality of progress counters 145 is updated (e.g. decremented) and if necessary the progress flag in the plurality of progress flags 150 is updated for the source port that has been selected. Finally, the request associated with the selected source port is allocated into the buffer 130 at step S160.

Figure 5:
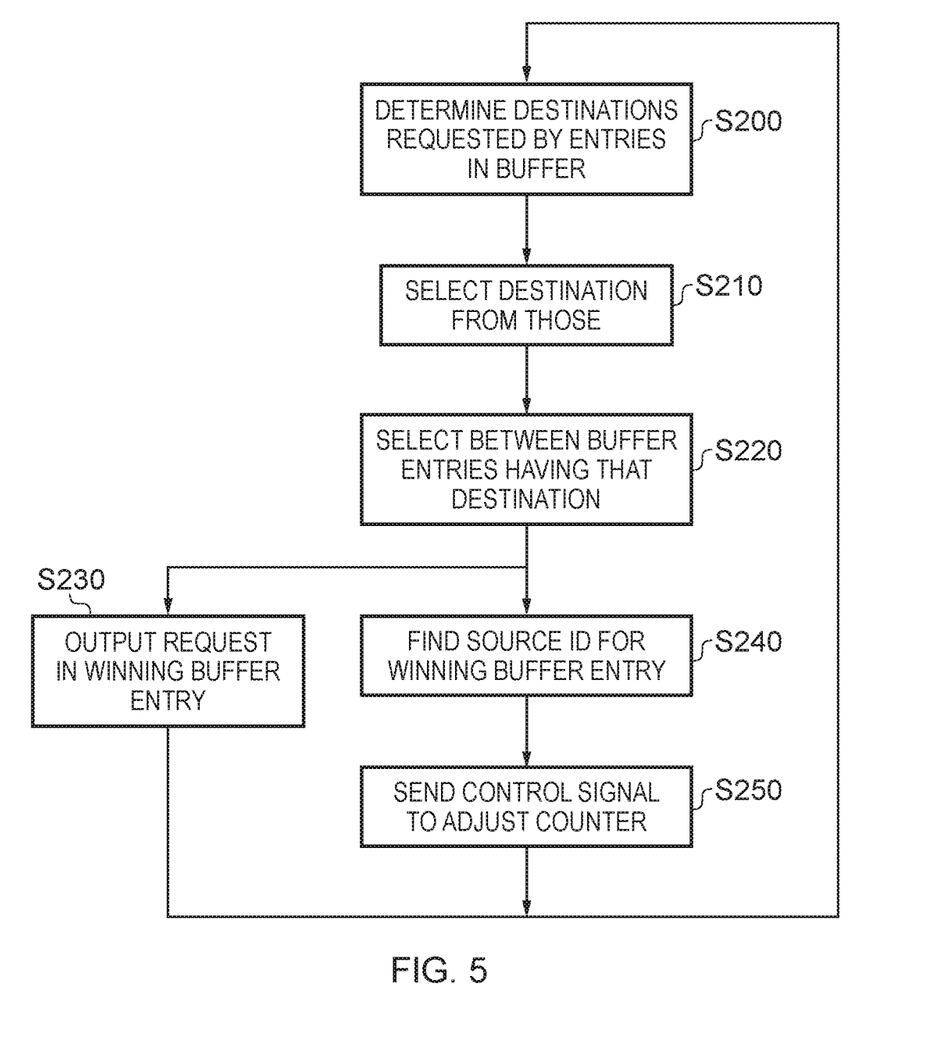
FIG. 5 illustrates, in flow chart form, a method of de-allocating entries from a buffer in accordance with one embodiment.

FIG. 5 illustrates, in flow chart form, a method of selecting a request to be output by the output switch 140. Such a method may be performed, for example, by the de-allocation circuitry 115. At step S200, the de-allocation circuitry 115 determines the destination port 125a to 125d that are requested by entries in the buffer. A destination port is selected from that set at step S210 and then a selection is made between entries of the buffer 130 that are directed to that destination port at step S220.

At step S230, the request in the winning buffer entry is output by the output switch 140 at the instruction of the de-allocation circuitry 115. At step S240, the ID of the source port that issued the request in the winning buffer entry is determined and at step S250 a control signal 135 is issued by the de-allocation circuitry 115 to the allocation circuitry 120 in order to adjust the counter value in the plurality of counter values 145 associated with the source port that issued the request in the winning buffer entry. For example, the control signal 135 may be sent to increment circuitry 170 in the allocation circuitry 120 in order to increment the counter associated with the source port.

Figure 6:
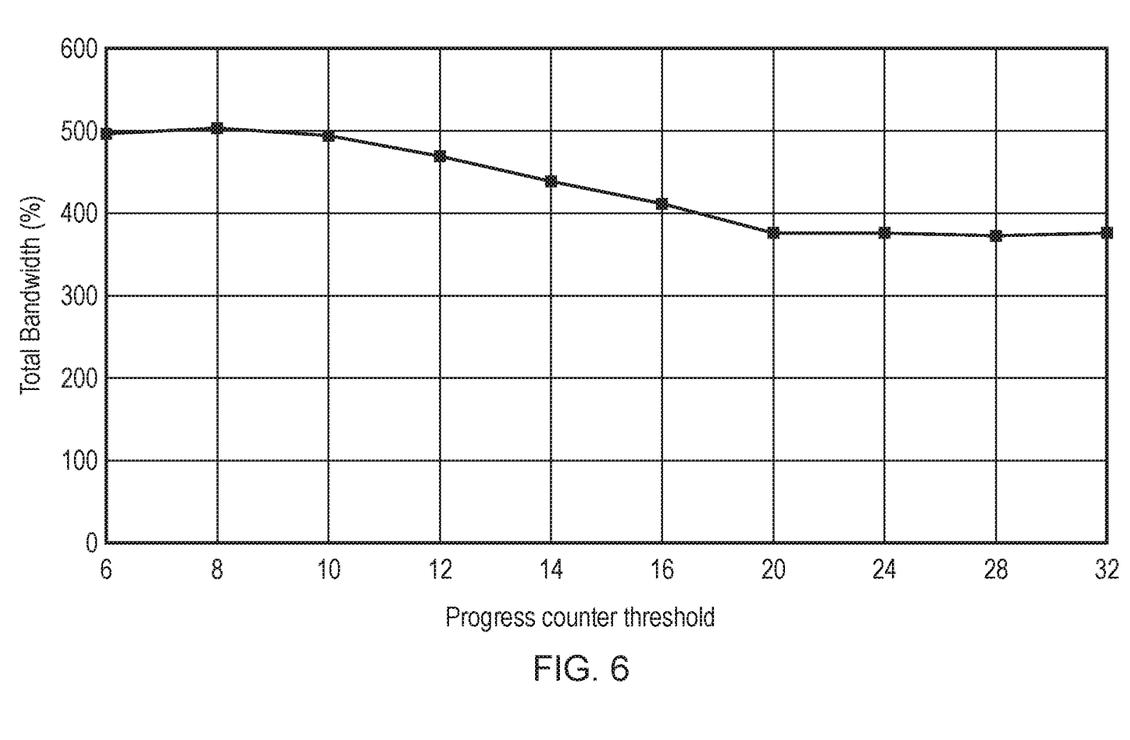
FIG. 6 is a chart illustrating the effect of counter values on the bandwidth of an interconnect in accordance with one embodiment.

FIG. 6 is a graph showing the affect on total bandwidth as a result of adjusting the threshold value for a counter.

The graph of FIG. 6 considers a situation in which there were 7 source ports and 6 destination ports. Two of the source ports targeted the same destination port thereby causing contention. The remaining source ports all target a unique destination. The total buffer size was 128 entries (however, in this embodiment, entries remain in the buffer for a short period of time after having been output by the output switching circuitry). The graph shows that in this particular instance, the optimal value of the counter for each source port is 8 and that an improvement in bandwidth of (504.6/371.68−1)=36% was achieved.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An interconnect to transfer requests between ports, the ports comprising a plurality of source ports and a plurality of destination ports, the interconnect comprising:
    storage circuitry to store said requests;
    input circuitry to receive said requests from said plurality of source ports, to select at least one selected source port from an allowed set of said plurality of source ports, and to transfer a presented request from said at least one selected source port to said storage circuitry;
    output circuitry to cause a request in said storage circuitry to be output at one of said plurality of destination ports;
    counter circuitry to maintain counter values for a plurality of tracked ports from amongst said ports, each counter value indicating the number of requests in said storage circuitry associated with a corresponding tracked port that are waiting to be output by said output circuitry; and
    filter circuitry to determine whether or not a given source port is in said allowed set in dependence on said counter circuitry, wherein:
    said plurality of tracked ports comprise said plurality of source ports, and
    said counter value corresponds to the number of requests stored in the storage circuitry that have been sent by that source port that have not yet been output by said output circuitry.

2. An interconnect according to claim 1, wherein the counter circuitry comprises:
    first adjustment circuitry to adjust the counter value associated with a port in a first direction in response to said presented request being associated with said port.

3. An interconnect according to claim 2, wherein said first direction is towards zero.

4. An interconnect according to claim 2, wherein the counter circuitry comprises:
    second adjustment circuitry to adjust the counter value associated with a port in a second direction opposite to said first direction in response to a request associated with said port being output by said output circuitry.

5. An interconnect according to claim 1, wherein the output circuitry comprises:
    further output circuitry to cause a request in said storage circuitry to be output at one of said plurality of source ports.

6. An interconnect according to claim 5, wherein said further output circuitry outputs said request at said one of said plurality of source ports in accordance with a cache coherency protocol.

7. An interconnect according to claim 5, wherein said further output circuitry outputs said request at said one of said plurality of source ports in response to a master device, connected to one of said plurality of source ports, comprising a cache that comprises a data value that is related to said request.

8. An interconnect according to claim 1, wherein said filter circuitry determines that a tracked port is in said allowed set in dependence on said counter value for said tracked port reaching a threshold value associated with that source port.

9. An interconnect according to claim 8, wherein said threshold value is different for at least some of said plurality of tracked ports.

10. An interconnect according to claim 1, wherein said counter circuitry maintains a plurality of flags each associated with one of said ports, wherein a flag associated with a port is set in dependence on said counter value associated with said port;
    said filter circuitry determines that a particular port is in said allowed set in dependence on whether or not said flag associated with said particular port is set.

11. An interconnect according to claim 8, wherein said threshold value is chosen having regard to balancing the inhibition of head-of-line blocking amongst said plurality of source ports.

12. An interconnect according to claim 8, wherein said threshold value is chosen so at to allow at least one request from each port to be stored in said storage circuitry and waiting to be output by said output circuitry.

13. An interconnect to transfer requests between ports, the ports comprising a plurality of source ports and a plurality of destination ports, the interconnect comprising:
    means for storing said requests;
    means for receiving said requests from said plurality of source ports, for selecting at least one selected source port from an allowed set of said plurality of source ports, and for transferring a presented request from said at least one selected source port to said means for storing;
    means for causing a request in said means for storing to be output at one of said plurality of destination ports;
    means for maintaining counter values for a plurality of tracked ports from amongst said ports, each counter value indicating the number of requests in said means for storing associated with a corresponding tracked port that are waiting to be output by said means for causing; and
    means for determining whether or not a given source port is in said allowed set in dependence on said means for maintaining counter values,
    wherein:
    said plurality of tracked ports comprise said plurality of source ports, and
    said counter value corresponds to the number of requests stored in the means for storing that have been sent by that source port that have not yet been output by said means for causing.

14. A method of transferring requests between ports, the ports comprising a plurality of source ports and a plurality of destination ports, the method comprising the steps:
    receiving said requests from said plurality of source ports;
    selecting at least one selected source port from an allowed set of said plurality of source ports;
    transferring a presented request from said at least one selected source port to storage circuitry;
    outputting, at one of said plurality of destination ports, a request in said storage circuitry;
    maintaining counter values for a plurality of tracked ports from amongst said ports, each counter value indicating the number of requests in said storage circuitry associated with a corresponding tracked port that are waiting to be output, wherein:

it is determined whether or not a given source port is in said allowed set in dependence on said counter values, said plurality of tracked ports comprise said plurality of source ports, and said counter value corresponds to the number of requests stored in the storage circuitry that have been sent by that source port that have not yet been output at one of said plurality of destination ports.

\* \* \* \* \*